United States Patent Office 3,784,545
Patented Jan. 8, 1974

3,784,545
1-(5-PHENYL-4-OXO-2-OXAZOLIN-2-YL)-
4-CINNAMOYLPIPERAZINES
Cheuk Man Lee, Waukegan, Ill., assignor to Abbott
Laboratories, North Chicago, Ill.
No Drawing. Filed May 31, 1972, Ser. No. 258,144
Int. Cl. C07d 51/72
U.S. Cl. 260—240 J                                    8 Claims

ABSTRACT OF THE DISCLOSURE 1-(5-phenyl-4-oxo-2-oxazolin - 2 - yl) - 4 - cinnamoyl-piperazines represented by the formula

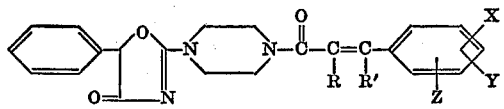

wherein: R is hydrogen or loweralkyl; R' is hydrogen or loweralkyl; and X, Y and Z each are hydrogen, halogen or loweralkoxy. The compounds exhibit anti-depressant activity.

DETAILED DESCRIPTION OF THE INVENTION

This invention relates to 1-(5-phenyl-4-oxo-2-oxazolin-2-yl) - 4 - cinnamoylpiperazines which are useful as anti-depressant agents.

The compounds of this invention are represented by the formula

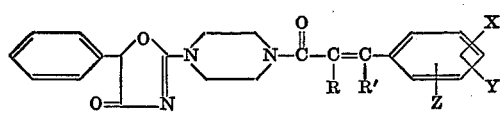

wherein: R is hydrogen or loweralkyl; R' is hydrogen or loweralkyl; and X, Y and Z each are hydrogen, halogen or loweralkoxy.

The term "loweralkyl" as used herein refers to $C_1-C_6$ straight and branched chain alkyl radicals including methyl, ethyl, n-propyl, iso-propyl, n-butyl, sec-butyl, n-pentyl, iso-pentyl, neo-pentyl, n-hexyl and the like.

The term "loweralkoxy" refers to methoxy, ethoxy, propoxy and butoxy.

The term "halogen" as used herein refers to chlorine, fluorine, bromine and iodine.

The compounds of this invention exhibit central nervous system activity and are particularly useful as anti-depressants at dosages of 25 to 50 mg./kg. of body weight daily. The anti-depressant activity of the compounds herein was established in the modified dopa test as described by Everett, "The Dopa Response Potentiation Test and Its Use for Screening for Anti-Depressant Drugs," Excerpt. Medica. International Congress Series 122, pages 164–167 (1966).

Generally speaking, compounds of this invention are prepared by reacting 1-(5-phenyl-4-oxo-2-oxazolin-2 - yl) piperazine with an appropriately substituted cinnamoyl halide in the presence of an acid acceptor in an inert solvent. The starting piperazines can be prepared according to the method described in U.S. Pat. 3,567,826. The cinnamoyl halides can be made by standard procedures.

The following examples further illustrate this invention.

EXAMPLE 1

1-(5-phenyl-4-oxo-2-oxazolin-2-yl)-4-(3,4,5-trimethoxy-cinnamoyl)-piperazine

A mixture of 5.0 g. of 3,4,5-trimethoxycinnamic acid, 2 ml. of phosphorus trichloride and 25 ml. of benzene was stirred and refluxed for 1 hour. The hot mixture was filtered and the filtrate was evaporated in vacuo. The residue was dissolved in 15 ml. of N,N-dimethylacetamide and added dropwise to a stirred solution of 3.9 g. of 1-(5-phenyl-4-oxo-2-oxazolin-2-yl)piperazine and 1.6 g. of triethylamine in 60 ml. of N,N-dimethylacetamide. The mixture was stirred at room temperature for 2 hours and was filtered. The filtrate was diluted with water and the product was collected and recrystallized from 3A-ethanol, M.P. 222–223°.

Analysis.—Calcd. for $C_{25}H_{27}N_3O_6$ (percent): C, 64.50; H, 5.85; N, 9.03. Found (percent): C, 64.77; H, 5.75; N, 8.95.

EXAMPLES 2–4

The following compounds were prepared according to the method of Example 1 substituting the appropriately substituted cinnamic acid for 3,4,5-trimethoxycinnamic acid.

1(3-bromo-4,5-dimethoxycinnamoyl) - 4 - (5-phenyl-4-oxo-2-oxazolin-2-yl)piperazine, M.P. 227–229°.

Analysis.—Calcd. for $C_{24}H_{24}BrN_3O_5$ (percent): C, 56.15; H, 4.72; N, 8.19. Found (percent): C, 56.30; H, 4.84; N, 8.11.

1-(p-methoxycinnamoyl) - 4 - (5 - phenyl - 4 - oxo - 2-oxazolin-2-yl)piperazine, M.P. 211–212°.

Analysis.—Calcd. for $C_{23}H_{23}N_3O_4$ (percent): C, 68.13; H, 5.72; N, 10.37. Found (percent): C, 67.87; H, 5.92; N, 10.53.

1-(5-phenyl-4-oxo-2-oxazolin-2-yl) - 4 - (3,4,5 - trimethoxy-β-methylcinnamoyl)piperazine, M.P. 164–165°.

Analysis.—Calcd. for $C_{26}H_{29}N_3O_6$ (percent): C, 65.12; H, 6.09; N, 8.76. Found (percent): C, 64.99; H, 6.38; N, 8.92.

EXAMPLE 5

1-(p-fluorocinnamoyl)-4-(5-phenyl-4-oxo-2-oxazolin-2-yl)piperazine

A mixture of 8.3 g. (0.05 mole) of p-fluorocinnamic acid, 13 ml. of thionyl chloride and 30 ml. of benzene was stirred and refluxed for 2 hours. The solvent and excess thionyl chloride was removed by evaporation in vacuo. The residue was treated in benzene and again evaporated in vacuo. The residue was dissolved in 25 ml. of N,N-dimethylacetamide and added dropwise to a stirred solution of 12.26 g. (0.05 mole) of 1-(5-phenyl-4-oxo-2-oxazolin-2-yl)piperazine, 5.06 g. (0.05 mole) of triethylamine and 120 ml. of N,N-dimethylacetamide. The mixture was stirred at room temperature for 2 hours and was filtered. The filtrate was diluted with water and the product was collected and recrystallized from 3A-ethanol; M.P. 241–243°.

Analysis.—Calcd. for $C_{22}H_{20}FN_3O_3$ (percent): C, 67.16; H, 5.13; N, 10.68. Found (percent): C, 66.88; H, 5.02; N, 10.67.

The compounds of this invention can be formulated into various pharmaceutically acceptable dosage forms such as tablets, capsules, pills and the like, for immediate or sustained release, by combining an active compound with a suitable pharmaceutically acceptable carrier or diluent according to methods well known in the art. Such dosage forms may additionally include excipients, binders, fillers, flavoring and sweetening agents and other therapeutically inert ingredients necessary for the formulation of the desired preparation.

I claim:
1. A compound of the formula

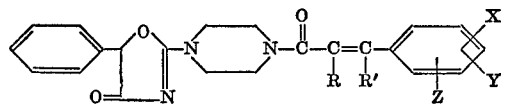

wherein: R is hydrogen or loweralkyl; R' is hydrogen or loweralkyl and X, Y and Z each are hydrogen, halogen or loweralkoxy.

2. A compound in accordance with claim 1 represented by the formula

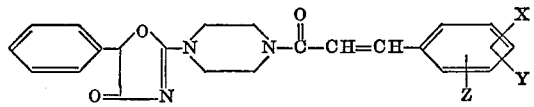

wherein each X, Y and Z are hydrogen, halogen or loweralkoxy.

3. A compound in accordance with claim 2: 1-(5-phenyl-4-oxo-2-oxazolin - 2 - yl) - 4 - (3,4,5 - trimethoxycinnamoyl)-piperazine.

4. A compound in accordance with claim 2: 1-(3-bromo-4,5-dimethoxycinnamoyl) - 4 - (5 - phenyl-4-oxo-2-oxazolin-2-yl)piperazine.

5. A compound in accordance with claim 2: 1(p-methoxycinnamoyl) - 4 - (5 - phenyl - 4 - oxo - 2 - oxazolin-2-yl)piperazine.

6. A compound in accordance with claim 2: 1-(p-fluorocinnamoyl) - 4 - (5 - phenyl-4-oxo-2-oxazolin-2-yl)-piperazine.

7. A compound in accordance with claim 1 represented by the formula

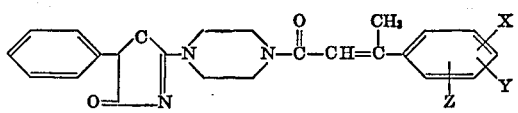

wherein each X, Y and Z are hydrozen, halogen or loweralkoxy.

8. A compound in accordance with claim 7: 1-(5-phenyl-4-oxo-2-oxazolin - 2 - yl)-4-(3,4,5 - trimethoxy-β-methylcinnamoyl)piperazine.

References Cited

UNITED STATES PATENTS 2,882,271  4/1959  Janssen _____ 260—240 J
3,567,826  3/1971  Aron-Samuel _____ 260—268 CX

OTHER REFERENCES

Chemical Abstracts, vol. 66, Abstract No. 95027p (pp. 8902-3), 1967.

JOHN D. RANDOLPH, Primary Examiner

U.S. Cl. X.R.

424—250; 260—268 H, 268 C

UNITED STATES PATENT OFFICE
CERTIFICATE OF CORRECTION

Patent No. 3,784,545                    Dated January 8, 1974

Inventor(s) Cheuk Man Lee

It is certified that error appears in the above-identified patent and that said Letters Patent are hereby corrected as shown below:

Column 2, line 10, change "6450" to read --64.50--;

Claim 7, please change the formula

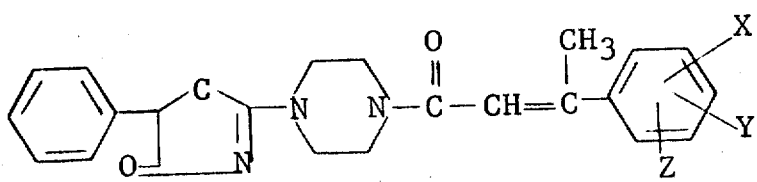

to read

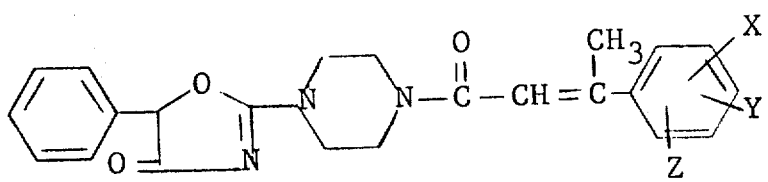

Signed and sealed this 3rd day of December 1974.

(SEAL)
Attest:

McCOY M. GIBSON JR.
Attesting Officer

C. MARSHALL DANN
Commissioner of Patents